United States Patent
Li et al.

(10) Patent No.: US 7,570,037 B2
(45) Date of Patent: Aug. 4, 2009

(54) HYBRID CONTROL METHODS FOR DIGITAL PULSE WIDTH MODULATOR (DPWM)

(75) Inventors: Jian Li, Blacksburg, VA (US); Dong S. Ha, Blacksburg, VA (US); Yang Qiu, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 251 days.

(21) Appl. No.: 11/561,104

(22) Filed: Nov. 17, 2006

(65) Prior Publication Data

US 2008/0116871 A1    May 22, 2008

(51) Int. Cl.
*G05F 1/575* (2006.01)
*G05F 1/618* (2006.01)

(52) U.S. Cl. ..................................... 323/283
(58) Field of Classification Search ................. 332/109, 332/151, 152; 327/172, 175, 276, 281; 323/283
See application file for complete search history.

(56) References Cited

U.S. PATENT DOCUMENTS

| | | | |
|---|---|---|---|
| 6,998,928 B2* | 2/2006 | Stengel et al. ............. 332/109 |
| 7,142,140 B2* | 11/2006 | Storvik et al. ............. 341/141 |
| 7,206,343 B2* | 4/2007 | Pearce ....................... 375/238 |
| 7,227,476 B1* | 6/2007 | Wong ......................... 341/53 |
| 7,245,512 B2* | 7/2007 | Leung et al. ................ 363/95 |
| 7,271,754 B2* | 9/2007 | Maksimovic et al. ...... 341/152 |
| 7,459,951 B2* | 12/2008 | Prodic ....................... 327/175 |
| 2001/0043652 A1* | 11/2001 | Hooley ..................... 375/238 |
| 2004/0146101 A1* | 7/2004 | Pearce ....................... 375/238 |
| 2005/0146366 A1* | 7/2005 | Steinschaden ............ 327/175 |
| 2008/0101543 A1* | 5/2008 | Yau .......................... 375/238 |

\* cited by examiner

*Primary Examiner*—Gary L Laxton
(74) *Attorney, Agent, or Firm*—Witham, Curtis, Christofferson & Cook, P.C.

(57) ABSTRACT

A digital pulse width modulator leverages clock frequency to achieve very fine duty cycle resolution by using a constant number of time slots for each state of a pulse signal and varying the number of time slots in a switching cycle within acceptable limits for variation of the switching cycle frequency or by using two relatively low frequency clocks of slightly differing frequency and selecting pulse leading and trailing edges in accordance with pulses output therefrom. A fine resolution of duty cycle adjustment can thus be provided corresponding to a much higher effective clock frequency than is actually used; allowing improvement of efficiency of clock and switching circuits, particularly in switching voltage regulator applications.

21 Claims, 10 Drawing Sheets

|  |  |  | Dq-1 |  |  |
|---|---|---|---|---|---|
| m* | 49 | 49 | 49 | 49 | 49 |
| n* | 252 | 251 | 250 | 249 | 248 |
| m*/n* | 0.1944 | 0.1952 | 0.1960 | 0.1968 | 0.1976 |
|  |  |  | Dq |  |  |
|---|---|---|---|---|---|
| m* | 50 | 50 | 50 | 50 | 50 |
| n* | 252 | 251 | 250 | 249 | 248 |
| m*/n* | 0.1984 | 0.1992 | 0.2000 | 0.2008 | 0.2016 |
|  |  |  | Dq+1 |  |  |
|---|---|---|---|---|---|
| m* | 51 | 51 | 51 | 51 | 51 |
| n* | 252 | 251 | 250 | 249 | 248 |
| m*/n* | 0.2024 | 0.2032 | 0.2040 | 0.2048 | 0.2056 |
Figure 6B
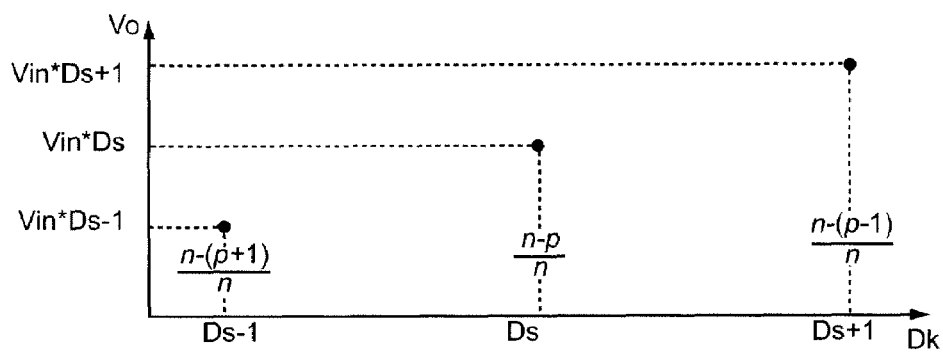
Figure 7
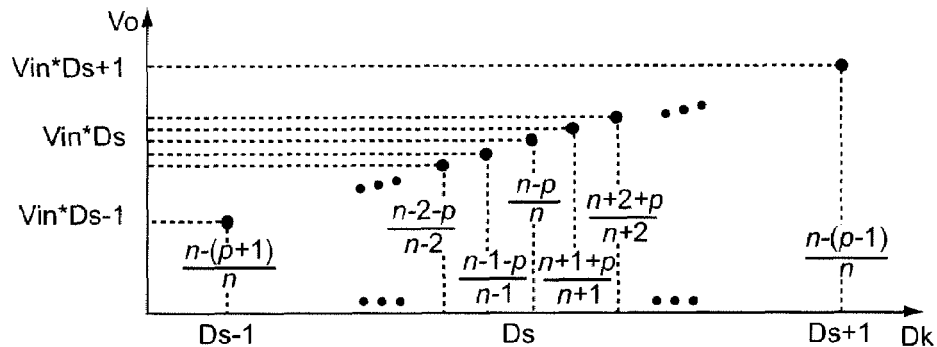
Figure 8

| | | | Ds-1 | | |
|---|---|---|---|---|---|
| p* | 51 | 51 | 51 | 51 | 51 |
| n* | 248 | 249 | 250 | 251 | 252 |
| (n*-p*)/n* | 0.7944 | 0.7952 | 0.7960 | 0.7968 | 0.7976 |

| | | | Ds | | |
|---|---|---|---|---|---|
| p* | 50 | 50 | 50 | 50 | 50 |
| n* | 248 | 249 | 250 | 251 | 252 |
| (n*-p*)/n* | 0.7984 | 0.7992 | 0.8000 | 0.8008 | 0.8016 |

| | | | Ds+1 | | |
|---|---|---|---|---|---|
| p* | 49 | 49 | 49 | 49 | 49 |
| n* | 248 | 249 | 250 | 251 | 252 |
| (n*-p*)/n* | 0.8024 | 0.8032 | 0.8040 | 0.8048 | 0.8056 |

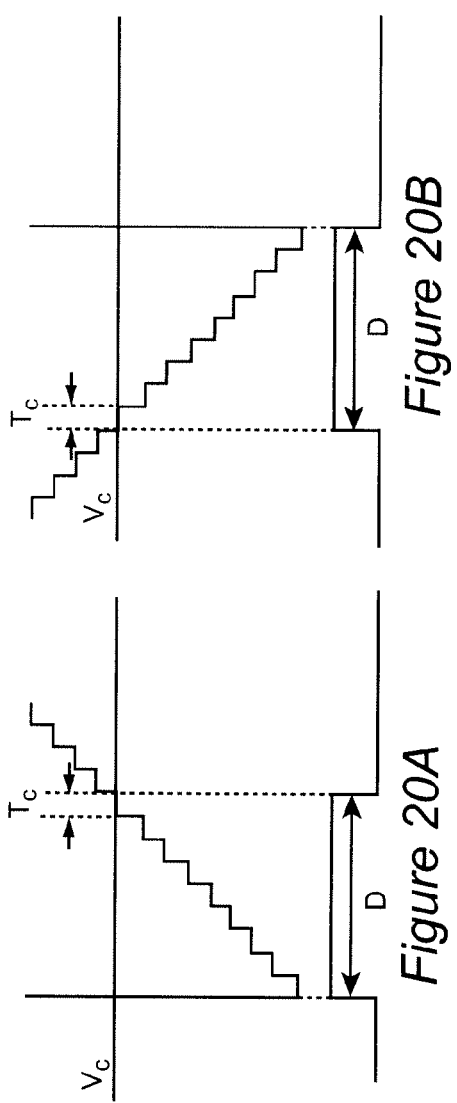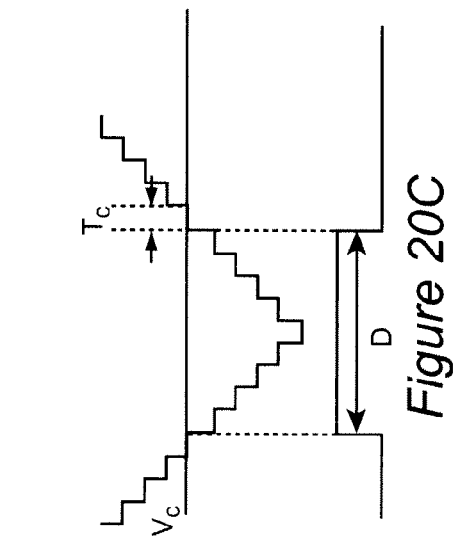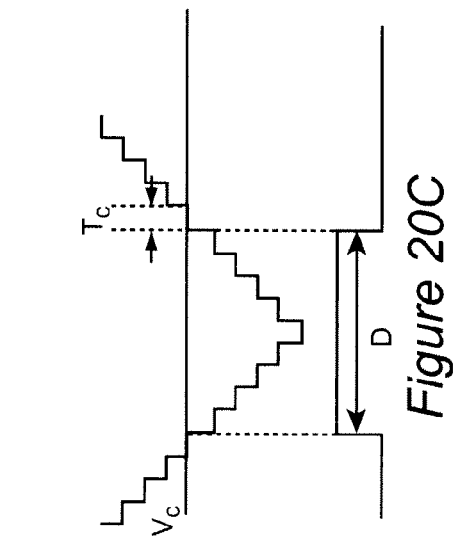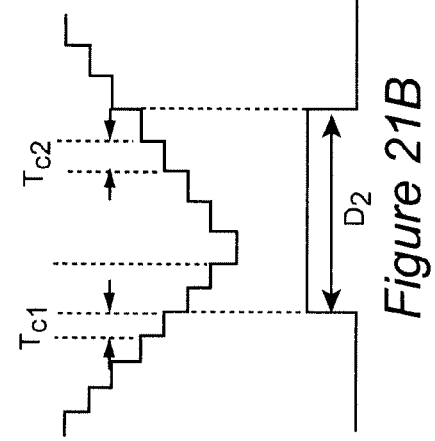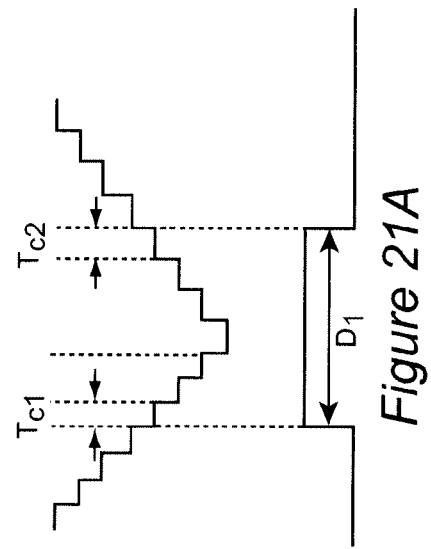

HYBRID CONTROL METHODS FOR DIGITAL PULSE WIDTH MODULATOR (DPWM)

BACKGROUND OF THE INVENTION

1. Field of the Invention

The present invention generally relates to digital control of pulse width modulators (PWMs), which, when digitally controlled, are sometimes referred to as digital pulse width modulators (DPWMs) and, more particularly, to pulse width modulation for control of output voltage of switching voltage regulators and power converters.

2. Description of the Prior Art

Pulse width modulation is well-known and has been used in a wide variety of electrical and electronic circuits because a pulse width modulated output (or the positive-going and/or negative-going transitions at the leading and trailing edges of a pulse or the like) can often be used to provide direct control of a circuit and possible simplification of the circuit for that reason. In particular, pulse width modulation for providing voltage regulation in switching power supplies and power converters is a particularly important application since it allows substantial improvement in efficiency over analog, unswitched voltage regulators which require an often substantial voltage drop across the regulator at relatively high current, thus dissipating substantial power. In contrast, in a switching voltage regulator, assuming adequate ripple filtering, the output voltage is controlled as a function of the switching duty cycle (the ratio of on-time of the switching to the switching cycle period); which duty cycle can be adjusted in accordance with a load current drawn to maintain the regulator output voltage within a small voltage tolerance. Essentially, a switching power converter or voltage regulator controls the proportion of time an input voltage is applied and thus input current provided to a filter. The regulated output voltage will therefore be some function of the input voltage and duty cycle of its application when input and output currents are equal.

Analog control circuits for controlling PWM circuits for voltage regulators and switching circuits are well-known. However, the current trend is toward using digital control circuits to obtain numerous advantages such as generally reduced power dissipation and noise immunity even though digital control circuits can only provide discrete nominal values of output voltage while modern digital circuits are being designed to operate at lower voltages and higher currents and with increasingly complex and stringent voltage regulation requirements. Therefore, use of digital control for switching voltage regulators and power converters imposes additional unavoidable design trade-offs in order to control the PWMs thereof with sufficient resolution and the design of digital pulse width modulators (DPWMs), sometimes referred to as a DPWM block, has thus become critical in several respects.

Specifically, there are currently three basic approaches to DPWM design: a counter-based DPWM, a delay line-based DPWM and a hybrid of these two types. In a counter-based DPWM, the input clock is counted by a counter and the counted number is compared with a (generally fed-back) value to control pulse width. This structure requires only a small footprint on a chip but high resolution requires high clock rates which ultimately causes relatively high power consumption. In a delay line-based DPWM, time slots are generated by the propagation delay of a pulse through cells of the delay line which are then selected by a multiplexer to generate PWM control signals. This type of DPWM has comparatively lower power consumption than a counter-based DPWM having comparable resolution but requires substantially more chip space than a counter-based DPWM. Additionally, a delay line-based DPWM is subject to variation of delay resolution due to operating temperature, manufacturing process variation and supply voltage variation.

Due to the complementary characteristics of these two approaches, the hybrid type DPWM has become popular for controlling pulse width modulation; using a counter-based approach for developing coarse time slots (thus allowing a low frequency clock to be used) and a delay line-based approach for fine time slot control (thus allowing use of a shorter delay line corresponding to a single coarse time slot. However, hybrid DPWMs still require substantial area for fine time slot resolution (typically about 100-150 psec.) and a relatively large number of delay cells (typically about 64 to 256) and also suffer from variation of delay resolution due to the causes noted above although such variation will generally be reduced as the maximum delay available from a delay line is reduced.

Further, for currently required and foreseeable resolution requirements for accuracy of voltage regulation, relatively high clock frequencies with associated relatively high power consumption are required even for relatively coarse voltage regulation while variation in delay line properties are becoming less tolerable. Thus requirements for increasingly accurate voltage regulation have heretofore been unavoidably linked to increased power consumption in DPWMs due to the increased clock frequency required to provide increased duty cycle resolution. Moreover, it has been considered desirable to maintain the switching frequency of a switched regulator substantially constant and relatively high to achieve good and consistent speed of response to changes in load (which, for many modern digital circuits such as microprocessors can vary widely and rapidly); requiring correspondingly rapid variation in duty cycle to accommodate such variation in the load and since high switching frequency power converters can provide high power density. Accordingly, the clock frequency must generally be a large (e.g. 50 or more) multiple of the regulator switching frequency to obtain acceptably high duty cycle resolution within each switching cycle.

SUMMARY OF THE INVENTION

It is therefore an object of the present invention to provide an arrangement capable of developing high resolution time slots which can be controlled with high accuracy while reducing both power consumption and chip space requirements as well as reducing variation of resolution of duty cycle.

It is another object of the present invention to provide for a substantial reduction in clock cycle for a given resolution of duty cycle.

It is a further object of the invention to avoid or reduce need for use of delay lines for fine duty cycle resolution.

It is yet another object of the invention to provide duty cycle resolution corresponding to a much higher effective clock frequency than is actually used.

In order to accomplish these and other objects of the invention, a digital pulse width modulator is provided comprising a switching circuit connected to an input voltage source, and a control circuit for establishing a duty cycle of said switching circuit, said control circuit comprising at least one of:

a clock circuit for establishing time slots, a circuit for establishing a constant number of time slots during which the switching circuit will be on or said switching circuit will be off during a switching cycle, and an arrangement for adjusting a number of time slots in a said switching cycle of said switching circuit; and two clock circuits operating at different frequencies and synchronized in a switching period of said switching circuit, and an arrangement for calculating a leading edge time in accordance with an output of one of the two clock circuits and a trailing edge time in accordance with an output of one of the two clock circuits to provide a desired pulse width within a switching period. A conventional technique can be used to provide a coarse duty cycle resolution with either or both arrangements in accordance with the invention providing a fine duty cycle resolution.

In accordance with another aspect of the invention, a method of digital pulse width modulation is provided including steps of setting a constant number of time slots in which a signal is in one of two states in each of a plurality of switching cycles, adjusting a number of time slots in each said switching cycle of said plurality of switching cycles, and limiting the number of time slots by which a switching cycle can be adjusted to limit variation of the switching cycle. Further steps of establishing two pulse trains at different clock frequencies, selecting a leading edge of a pulse in accordance with a pulse of one of said two pulse trains, and selecting a leading edge of a pulse in accordance with a pulse of one of said two pulse trains may be used alternatively on in addition thereto.

BRIEF DESCRIPTION OF THE DRAWINGS

The foregoing and other objects, aspects and advantages will be better understood from the following detailed description of a preferred embodiment of the invention with reference to the drawings, in which:

FIGS. 5, 6A, 6B, 7, 8, 9A and 9B illustrate application of the invention to ranges of duty cycle in a manner which desirably limits variation of switching frequency, FIGS. 10 and 11 graphically illustrate duty cycle and output voltage resolution as a function of load, respectively, compared to a conventional method, FIGS. 20, 21, 22A and 22B illustrate a perfecting feature of the invention to obtain effectively reduced time slot duration at relatively low clock frequencies, and FIG. 23 graphically illustrates the effectiveness of the perfecting feature of the invention illustrated in FIGS. 20-22B.

DETAILED DESCRIPTION OF A PREFERRED EMBODIMENT OF THE INVENTION

Figure 1:
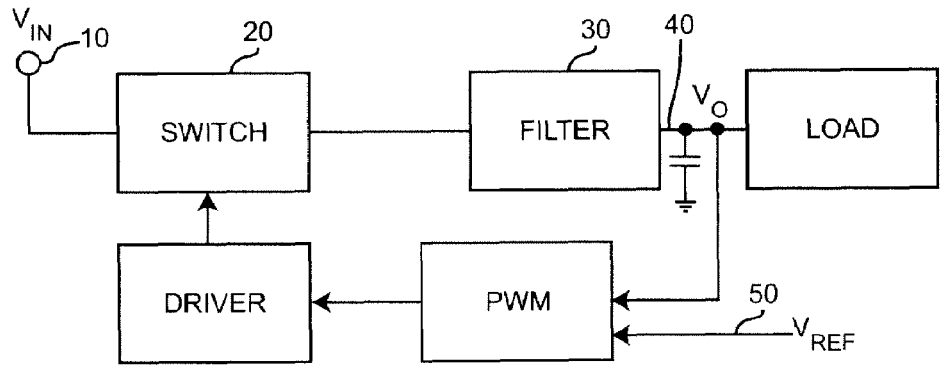
FIG. 1 is a generalized block diagram of a switching voltage regulator including a digital pulse width modulator.

Referring now to the drawings, and more particularly to FIG. 1, there is shown a generalized block diagram of a switching voltage regulator including a digital pulse width modulator. It should be appreciated that, while the general architecture of a switching voltage regulator illustrated in FIG. 1 is known, at the degree of abstraction of the illustration of FIG. 1 the invention may or may not be considered as depicted therein. Therefore, no portion of FIG. 1 is admitted to be prior art in regard to the present invention.

As illustrated in FIG. 1, a switching voltage regulator includes a source 10 of input power at a voltage which may or may not be greater than the output voltage required. For simplicity of the discussion of FIG. 1, however, it will be assumed that $V_{in}$ is greater than $V_o$. Input power is periodically connected and disconnected by switch 20 under control of a digital pulse width modulator (DPWM) circuit 60, sometimes referred to as a DPWM block. A filter 30 is also generally provided to substantially eliminate variation of $V_o$ at output 40 as $V_{in}$ is connected and disconnected at switch 20 and to accommodate transient changes in load. Some arrangement 50, details of which are not important to the practice of the invention, is generally provided to obtain a signal by which the duty cycle of the DPWM 60 is controlled to achieve voltage regulation at a desired voltage. Such an arrangement may be simply a connection to the power input to a load device (e.g. between the voltage regulator and the load but preferably proximate to the load) with an analog-to-digital converter or any of a number of other types of circuits including a simple analog feedback signal connection which will be abundantly evident to those skilled in the art. The DPWM 60 is arranged to deliver a control signal or signals which adjust the duty cycle of switch 20 to obtain the desired voltage in a manner well-understood in the art.

Figure 2:
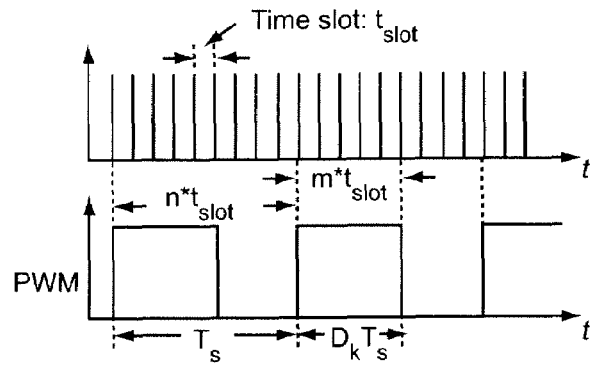
FIG. 2 is a graphical illustration of the general principles of digital pulse width modulation which will be useful for understanding the invention.

FIG. 2 shows a graphical depiction which will be helpful in conveying an understanding of the basic principles of digital pulse width modulation. The upper trace of FIG. 2 shows a pulse train developed by the system clock of a switching regulator. The lower trace illustrates a pulse width modulated waveform in which the on and off times each substantially correspond to an integral number of the pulses of the upper trace which is a basic constraint on the accuracy and resolution of DPWMs.

Specifically, the duty cycle, $D_k$, is the proportion of on (or off) time to the duration of a full pulse width modulation cycle and is defined as:

$$D_k = (m \times t_{slot})/(n \times t_{slot}) = m/n \quad (1)$$

where m and n are positive numbers and is usually expressed as a fraction or a percentage since, by definition, the duty cycle must have a value between or equal to zero and one. The resolution of the duty cycle, $\Delta D$, ultimately controls the resolution of the regulated output voltage of a DPWM switched voltage regulator. That is, $$\Delta V_{DPWM} = V_{in} \times \Delta D, \quad (2)$$

expressing the fact that the resolution of a discrete level of output voltage (e.g. the minimum controllable change in nominal output voltage; the actual output voltage varying slightly with load transients due to filtering) will correspond to the minimum increment of duty cycle of the switching regulator.

Nearly all existing DPWM designs, for reasons alluded to above, are based on a constant switching frequency control scheme in which n is a constant and m is a variable. The resolution, $\Delta D$, of the duty cycle, $D_k$, is thus $$\Delta D = ((m+1)/n) - m/n = 1/n. \qquad (3)$$

Thus, with a given switching frequency, $F_{SW}$, of switch 20 and a desired output voltage resolution ($\Delta V_{DPWM}$) requirement, the time slot ($t_{slot}$) requirement may be calculated as $$t_{slot} = (1/F_{SW}) \times (\Delta V_{DPWM}/V_{in}). \qquad (4)$$

For example, for a typical switching frequency, $F_{SW}$, of 2 Mhz and typical values of voltage resolution and input voltage of $\Delta V_{DPWM}=3$ mV and $V_{in}=12$V, respectively, $t_{slot}$ is approximately 125 psec. Such a small time slot presents stringent challenges for DPWM design. Thus resolution of voltage or switching duty cycle directly corresponds to clock frequency (as distinct from switching frequency, $F_{SW}$) in known designs. In contrast, the invention provides resolution of duty cycle and regulated voltage corresponding to an effective clock frequency much higher than that actually used, allowing improvement in reduction of required power and increase of efficiency as will now be explained.

The invention, in accordance with the basic principles of a preferred embodiment thereof, provides two basic methods of improving resolution which are preferably used together but over independent ranges of desired duty cycle values (with or without inclusion of the known duty cycle control over a third range of duty cycle values) as a third method (sometimes referred to hereinafter as "method #3") which is preferred, particularly for powering microprocessors and other digital circuits where the range of duty cycle values is required to accommodate wide swings in load current. These methods may be supplemented by inclusion of a perfecting feature of a dual clock PWM scheme which is not required for practice of the invention in accordance with its basic principles and can also be used separately or with the known method of digital pulse width modulation.

The first method (sometimes referred to as method #1), contrary to the DPWM design currently known and most widely used, holds m constant and varies n or, in other words, provides a constant on-time, $m \times t_{slot}$ (e.g. an integral number m of time slots), for each pulse width modulation cycle while varying $F_{SW}$. Under these conditions, the duty cycle resolution is given by $$\Delta D' = (m/n) - m/(n+1) = m/n(n+1) \approx D/(n+1) \qquad (5)$$

Figure 3:
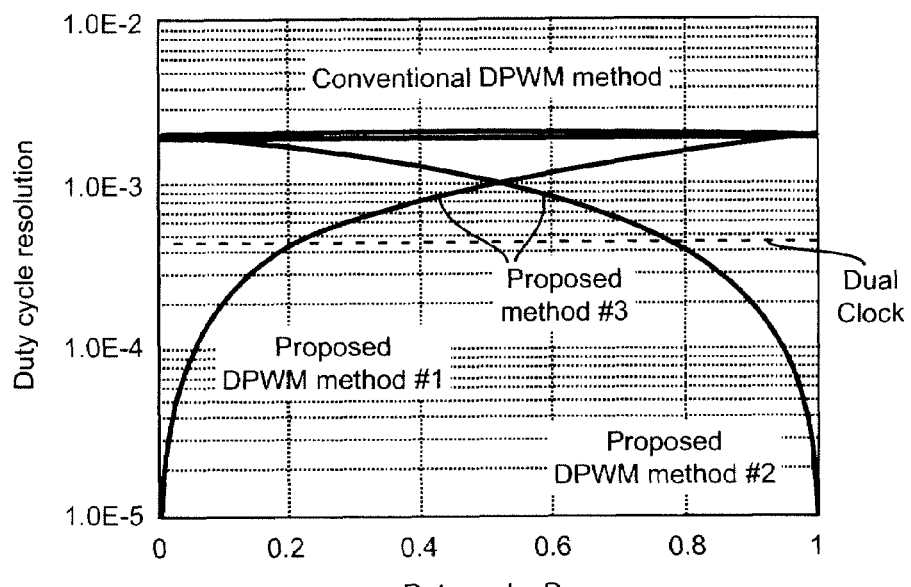
FIG. 3 is a graphical comparison of the duty cycle resolution provided by the invention and by a known method.

If $D<<1$ at the steady state of a switching voltage regulator, comparison with equation (2) shows that $\Delta D' << \Delta D$. In other words, this first method in accordance with the invention provides approximately 1/D times higher duty cycle resolution than the conventional method of DPWM. However, it should be recognized that the increase in resolution is not constant and varies with the duty cycle at which the DPWM is actually controlled; becoming less as duty cycle increases and becoming equivalent to the conventional method described above when the duty cycle reaches 1 (or 100%—always on) but, conversely, becoming much finer for smaller duty cycles as is depicted in FIG. 3.

The second method in accordance with the invention is substantially the inverse of the first method and is complementary thereto in effect. Specifically, the second method (sometimes referred to as method #2) provides a constant off time and varies n and, hence, $F_{SW}$ as in method #1, described above. While method #1 provides much improved resolution in duty cycle when the duty cycle is small, the improvement over the conventional DPWM method is marginal as duty cycle approaches 1, as alluded to above and illustrated in FIG. 3. However, by providing a constant off time and varying n in method #2, much improved and very fine resolution can be obtained for large duty cycles, as also depicted in FIG. 3.

Analytically, if the constant off-time is expressed similarly to on time above as $p \times t_{slot}$, the duty cycle can be expressed as $$D_k = (n-p)/n. \qquad (6)$$

It follows that the resolution of $D_k$ can be expressed as $$\Delta D'' = (((n+1) - p)/(n+1)) - ((n-p)/n) \qquad (7)$$
$$= p/n(n+1) \approx (1-D)/(n+1).$$

Comparing equation (7) with equation (5) it can be readily seen that method #2 is precisely complementary to method #1 but produces much increased resolution for large duty cycles whereas method #1 did so for small duty cycles although only marginal improvement where the duty cycle approaches zero, as illustrated in FIG. 3. As with method #1, the improvement in resolution varies with D and is 1/1-D times the resolution of the conventional DPWM method (e.g. becoming equivalent to the conventional DPWM method when D=0).

It should be appreciated that the improvement in resolution over the conventional DPWM method using either method #1 or method #2 in accordance with the invention is the same (e.g. a factor of two improvement over known DPWM methods) at a 50% duty cycle. Therefore, if method #1 is used at or below a 50% duty cycle and is combined with use of method #2 at or above a 50% duty cycle as a basic form of method #3, the worst case resolution will be a factor of two improvement over the conventional DPWM method. Perhaps more importantly, it should be appreciated that this improvement is achieved in accordance with the invention without increase of clock frequency and thus provides resolution of duty cycle commensurate with an effective clock frequency at least twice that actually used and without incurring any penalty in power consumption. (Moreover, using a combination of method #1 and method #2 as method #3, the duty cycle resolution will be very fine at very low and very high duty cycles which is highly appropriate for applications involving powering of microprocessors and other complex digital circuits which may have multiple modes of operations requiring very high or very low but not generally intermediate levels of current.) Conversely, duty cycle resolution can be improved at all but a 50% duty cycle (or even allowing a reduction of resolution at loads requiring a duty cycle near 50% which occur very seldom or not at all) while reducing power consumption through allowing a lower (e.g. by a factor of two, yielding the same duty cycle resolution as known methods at 50% duty cycle, or slightly more) clock frequency.

In this regard, it should be appreciated that there are numerous ways to employ method #1 or method #2 either separately or together in the basic form of method #3 as described above in which m (in method #1) and p (in method #2) are fixed to provide a fixed on or off time and where only n is varied. While such a fixed on time or fixed off time or a combination thereof provides an improvement in duty cycle resolution, it does not, in and of itself, guarantee that duty cycle resolution will be adequate or that hardware requirements will be suitably limited. In other words, while m or p is fixed in the basic form of method #3, it is desirable that m or p nevertheless be chosen such that n will be in a suitable range and that variation in n can be suitably limited for reasons alluded to above in regard to use of at least a near-constant switching frequency, $F_{SW}$. For example, in FIG. 3, the constant resolution of the conventional DPWM method illustrated is $2\times10^{-3}$ which corresponds to n=500, the number of time slots in a single switching cycle, and where m can vary between zero and n. Therefore, it is considered preferable in implementation of method #3 to use the conventional DPWM method for coarse regulation of the duty cycle in order to establish an appropriate value of m or p for a suitable value of n and to then provide for suitably small variation of n in order to achieve increased resolution. This preferred form of method #3, as a practical matter, also tends to compensate for the worst case resolution discussed above in regard to the basic form of method #3. That is, if the coarse regulation provides a duty cycle which is very close to the desired value, the worst case, factor of two, improvement in resolution provided as a fine duty cycle regulation is likely to be adequate. Thus, in the preferred form of method #3, n, m and p are all allowed to vary simultaneously and, by doing so, the variation in each, particularly n, can be suitably limited, for example to limit variation in switching cycle due to variation in n to ±2% or less, even when the duty cycle must vary greatly, such as to accommodate large and sudden changes in the load on a voltage regulator powering a microprocessor, as alluded to above.

The operation of the preferred form of method #3 will now be explained in connection with FIGS. 4-6B for the case where D<0.5 and in connection with FIGS. 7-9B for the case where D>0.5, particularly in regard to minimization of variation in n. In this regard, while variation in n, contrary to the conventional practice, is important to achieving the meritorious effects of the invention, particularly in regard to achieving a resolution in duty cycle characteristic of a higher effective clock frequency than is actually used, and that such effects increase with increasing values of n, it is nevertheless desirable to minimize variation in n in order to minimize variation in switching frequency, $F_{SW}$, since the period of the switching frequency must provide n time slots or clock cycles.

Figure 4:
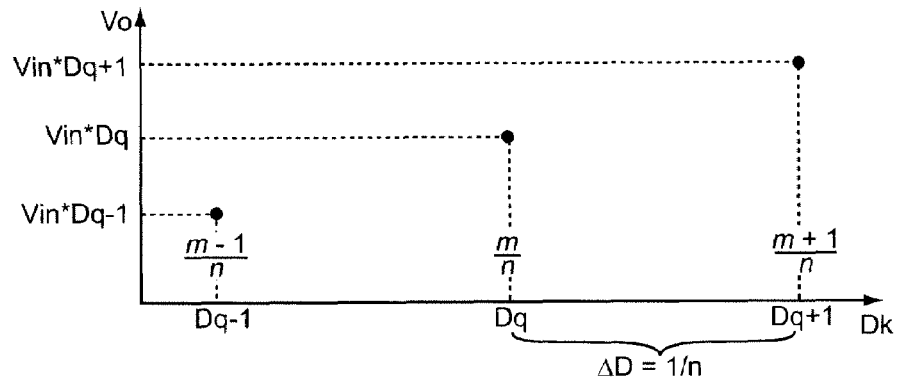
FIG. 4 illustrates the relationship between duty cycle and output voltage in accordance with the invention.
Figure 5:
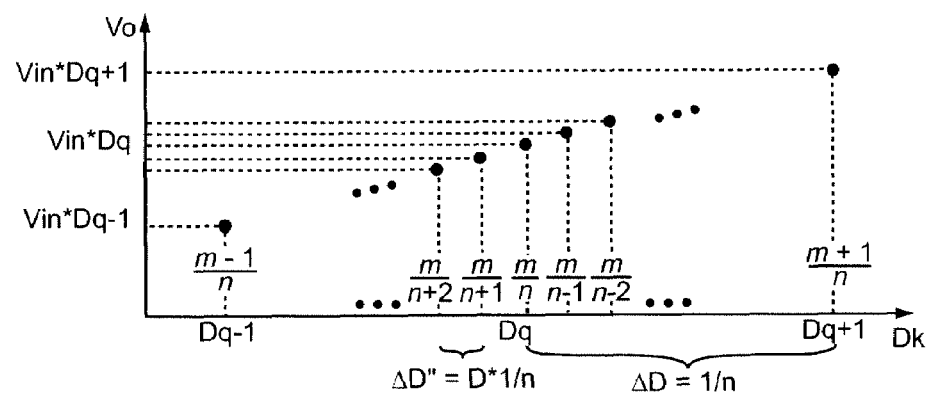
Figure 6A:
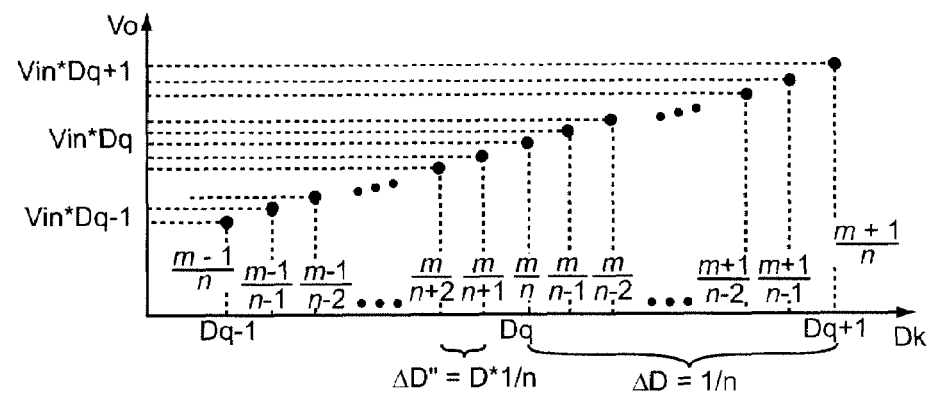

FIG. 4 illustrates the relationship between duty cycle and output voltage of a switching voltage regulator in accordance with the conventional DPWM method or the coarse regulation of the preferred form of method #3, as described above. In this case, n is constant and $D_{q-1}$, $D_q$ and $D_{q+1}$ are thus adjacent discrete values of $D_k$ corresponding to (m−1)/n, m/n and (m+1)/n, respectively, and the duty cycle resolution is $\Delta D=1/n$. In accordance with equation (2) above, the corresponding output voltages are thus $V_{in} \times D_{q-1}$, $V_{in} \times D_q$ and $V_{in} \times D_{q+1}$ (e.g. for consecutive values of m or p). The preferred form of method #3 can thus be achieved for applying fine duty cycle resolution at any or all of the points depicted in FIG. 4 as is illustrated for point $D_q$ in FIG. 5 and for all points $D_{q-1}$, $D_q$ and $D_{q+1}$ in FIG. 6A.

While numerous methodologies for minimization of variation of n will be apparent to those skilled in the art, a suitable rule for doing so is as follows:

(1) The variation of n is $$\Delta n = [\Delta D/\Delta D'] \approx [1/D] = u$$

(Function[*]: [x]=x−mod(x,1))

(2) Possible values of n:
If u is an odd number:

$$n-(u-1)/2, \ldots, n-1, n, n+1, \ldots, n+(u+1)/2$$

If u is an even number:

$$n-u/2, \ldots, n-1, n, n+1, \ldots, n+u/2.$$

For example, for n=500, $D_{q-1}=49/250$, $D_q=50/250$, and $D_{q+1}=51/250$, FIG. 6B shows the selection of m and n and the corresponding extended (e.g. including fine resolution in accordance with the preferred form of method #3) duty cycle values. For the conventional DPWM method or coarse regulation in accordance with the invention, $\Delta D=0.004$ (e.g. the difference in the m*/n* values for $D_{q-1}$, $D_q$ and $D_{q+1}$) while for this piecewise implementation of method #3 including fine regulation, $\Delta D'=0.0008$ which is five times finer than the coarse value while holding the switching frequency variation to ±0.8%.

A similar analysis can be applied to the case where D>0.5 as illustrated in FIGS. 7-9B. Specifically, a corresponding rule to minimize variation in n is:

(1) The variation of n is $$\Delta n = [\Delta D/\Delta D''] \approx [1/D] = v$$

(Function[*]: [x]=x−mod(x,1))

(2) Possible values of n:
If v is an odd number:

$$n-(v-1)/2, \ldots, n-1, n, n+1, \ldots, n+(v+1)/2$$

If v is an even number:

$$n-v/2, \ldots, n-1, n, n+1, \ldots, n+v/2.$$

Figures 9A, 9B:
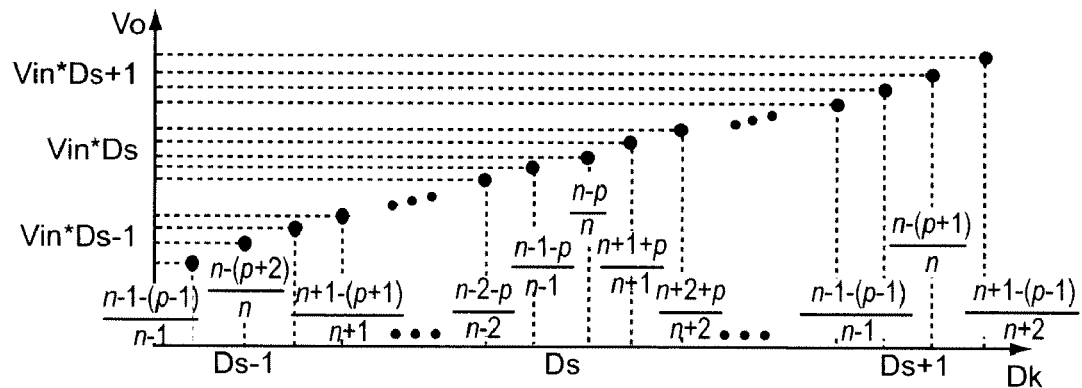

A corresponding table for n=500, $D_{q-1}=199/250$, $D_q=200/250$, and $D_{q+1}201/250$, is provided in FIG. 9B showing the selection of m and n and the corresponding extended (e.g. including fine resolution in accordance with the preferred form of method #3) duty cycle values. For the conventional DPWM method or coarse regulation in accordance with the invention, $\Delta D=0.004$ while for this piecewise implementation of method #3 including fine regulation, $\Delta D''=0.0008$ which is five times finer while holding the switching frequency variation to ±0.8%.

It can also be appreciated from FIGS. 4-9B that the invention substantially leverages the number of time slots provided in each switching cycle at switching frequency $F_{SW}$ to provide duty cycle change increments generally about 1/500 (e.g. the proportionate change in switching period or switching frequency when n is incremented or decremented by one) of that corresponding to a time slot for customary voltage regulator design parameters or a resolution about 500 times that of the conventional regulator. Specifically, $((1/F_{SW})/t_{slot})=(1/300^3)/6.7^{-9}=500$. That is, since the fixed on or fixed off period can comprise any integral number, m, of the n time slots in a switching period and n can vary as much as the resulting variation in $F_{SW}$ can be tolerated, the potential improvement in duty cycle resolution provided by the invention can be up to (1/D) or 1/(1−D) times the coarse resolution of the preferred embodiment of the invention in accordance with the conventional DPWM method. Therefore, for practical values of n, it can be seen that the improvement in duty cycle resolution provided by the invention is very much higher to the point where use of delay lines with their associated disadvantages can be eliminated or, at least, severely limited.

Figure 10:
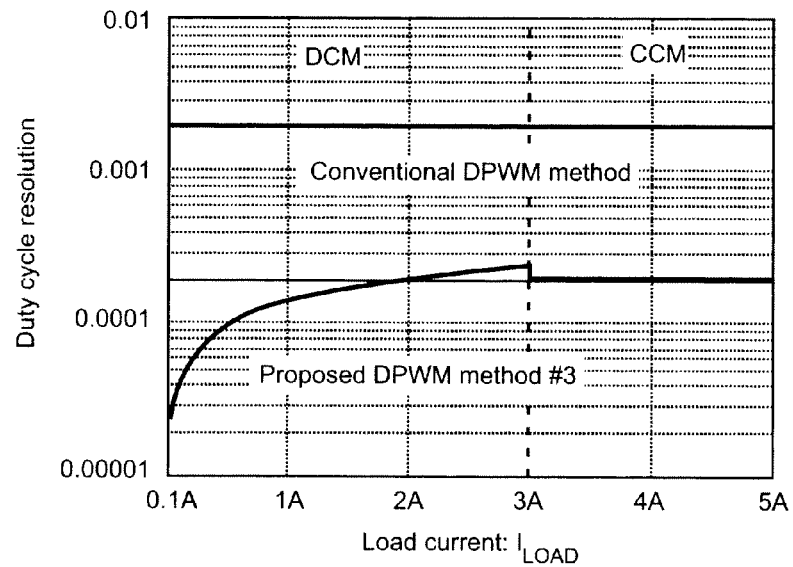
Figure 11:
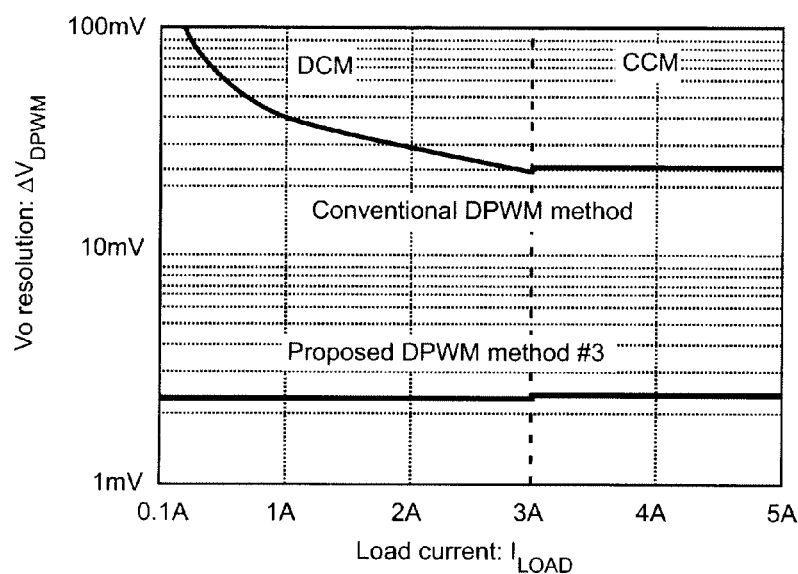

In this regard, FIGS. 10 and 11 illustrate a comparison of duty cycle resolution and voltage resolution between the conventional DPWM method and the invention in both the continuous conduction mode (CCM) and discontinuous conduction mode (DCM). It can be seen from FIG. 10 that duty cycle resolution is much finer through use of the invention and resolution increases with reduction of load current. In FIG. 11, voltage resolution is correspondingly finer than provided by the conventional DPWM method and, moreover, the regulated voltage is substantially constant regardless of load. This latter advantage provided in accordance with the invention is particularly important for powering devices such a microprocessors which exhibit large and rapid changes in the load they present in respective operational modes such as fully operational, standby and/or so-called sleep mode.

Figure 12:
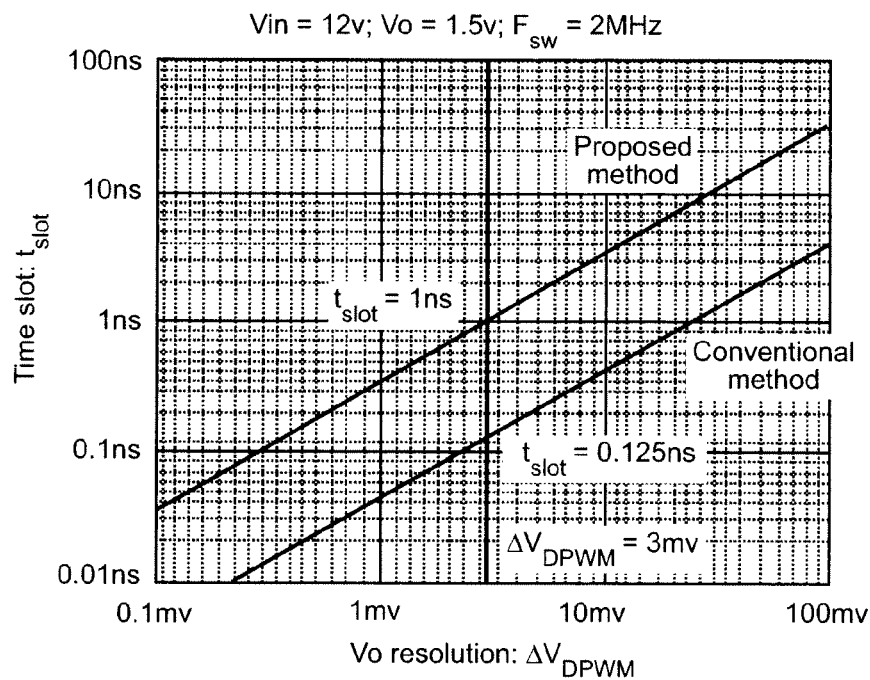
FIG. 12 is a graphical comparison of time slot requirements in accordance with the invention and in accordance with a known duty cycle control method.

An additional benefit derived by the invention which has not been heretofore achieved is a reduction in the time slot requirements as alluded to above. Based on equations (1), (2) and (5), above and since $D=V_o/V_{in}$, the duration of the required time slot can be expressed in terms of a given voltage resolution (calculated in accordance with equation (6), the equation for methods #1 and #3, i.e. since $V_{in}$ and $V_o$ are quite different, the time slot requirements are also different) as:

$$t_{slot} = \Delta V_{DPWM}/(F_{SW} \times V_o)$$

from which it is readily apparent that, for a given resolution, the time slot duration required by the invention is very much longer than that required by the conventional DPWM method since the invention allows a given resolution to be achieved using a much reduced number of time slots in each switching cycle. For example, for $F_{SW}=2$ MHz, $\Delta V_{DPWM}=3$ mV, $V_{in}=12$ V and $V_o=1.5$ V, $t_{slot}$ is about eight times larger than that required by the conventional DPWM method, as illustrated in FIG. 12. Such a relaxation of time slot requirements clearly reduces the challenge of high clock frequency and time slot duration accuracy for DPWM block design either by reducing the number of delay cells to decrease required chip area or to reduce the clock frequency to reduce power requirements and chip space requirements for necessary counter capacity or a combination of the two. Thus, the invention can be used to increase the duty cycle resolution which also reduces limit cycle oscillations (oscillations which exist in a non-linear system) or reduce the design challenge in regard to power consumption, clock frequency, chip space, and/or stability of operation.

Figure 13:
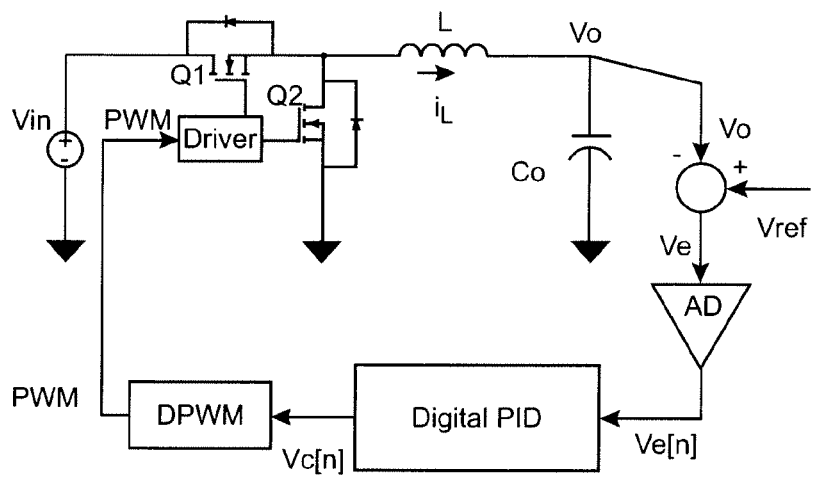
FIG. 13 is a schematic diagram of an exemplary voltage regulator including the invention.

The efficacy of the invention to provide such effects has been verified by simulation. FIG. 13 schematically illustrated a so-called buck converter; the operation of which is well understood in the art. Essentially, an inductor is placed in series with the input power supply $V_{in}$ and, as current through the inductor changes due to the operation of switches Q1 and Q2 (Q1 connecting and disconnecting the input power and Q2, operating in a complementary fashion to Q1, providing a current path for the inductor when Q1 is off) develops a voltage thereacross which opposes the change in current. Thus, the buck converter reduces the voltage $V_o$ below $V_{in}$ and provides both current and voltage to the output or load, preferably using capacitor Co as a filter. The output voltage is compared with a reference Vref and an error voltage Ve is developed which is converted to a digital signal Ve[n] which is fed back, preferably with compensation provided by a compensator of the so-called PID type (P: proportional, I: integral, D: derivative) to control a digital pulse width modulator which, in turn controls a driver for Q1 and Q2. It should be understood that the invention is not limited to use with buck converters but is applicable to all voltage regulator and power converter topologies which include pulse width modulated switching to control the voltage at which regulation is performed; a buck converter being illustrated for simplicity and familiarity to those skilled in the art, to whom correspondence to the more general illustration of FIG. 1 will be evident.

Figure 14:
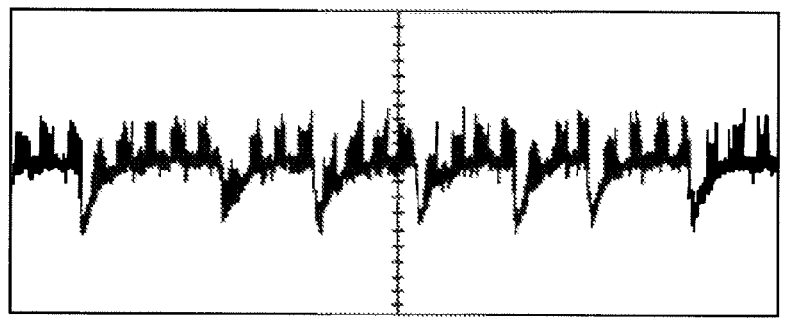
FIGS. 14 and 15 show output voltage waveforms using a conventional DPWM and the invention, respectively.

The parameters used for simulation in the circuit of FIG. 13 are: $V_{in}=12$ V; Vref=1.2 V; sampling frequency, Fs=300 KHz; analog-to-digital (ADC) resolution, $V_{ADC}=8$ mV; system clock frequency, $F_{clock}=150$ MHZ and $T_{slot}=1/F_{clock}$. With the conventional DPWM, if the switching frequency $F_{SW}=300$ KHz and $\Delta D=(1/F_{clock})/(1/F_{SW})=0.2\%$, $\Delta V_{DPWM}=V_{in}\times \Delta D=24$ mV which is larger than $V_{ADC}$ (8 mV) and thus the time slot limits the resolution of the conventional DPWM below that of the analog-to-digital converter. There are also severe limit cycle oscillations on output voltage $V_o$ as illustrated in FIG. 14.

Figure 15:
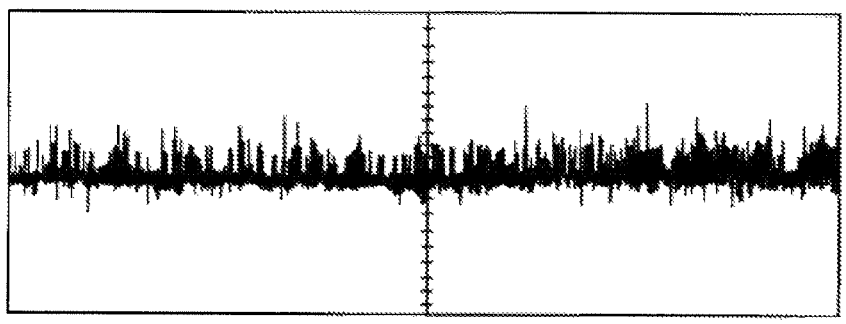

In contrast, using method #1, described above, m=50 (e.g. corresponding to a constant on time of about 33 μsec.), $\Delta D'=D\times((1/F_{clock})/(1/F_{SW}))=0.02\%$ (a ten fold improvement over the conventional DPWM method). $\Delta V_{DPWM}=V_{in}\times \Delta D'=2.4$ mV, which is less than $\Delta VADC$ (8 mV) which, contrary to the conventional DPWM, thus does not limit resolution below that of the digital-to-analog converter (which, in any case, has a resolution at least equal to the voltage regulation resolution required by the intended load). Limit cycle oscillations are greatly reduced as illustrated in FIG. 15.

Figure 16:
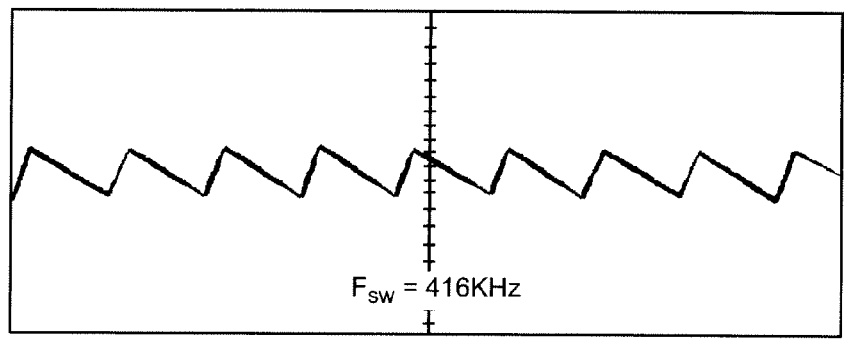
FIGS. 16 and 17 illustrate the effects of input voltage on the output waveform when switching frequency is allowed to vary widely.
Figure 17:
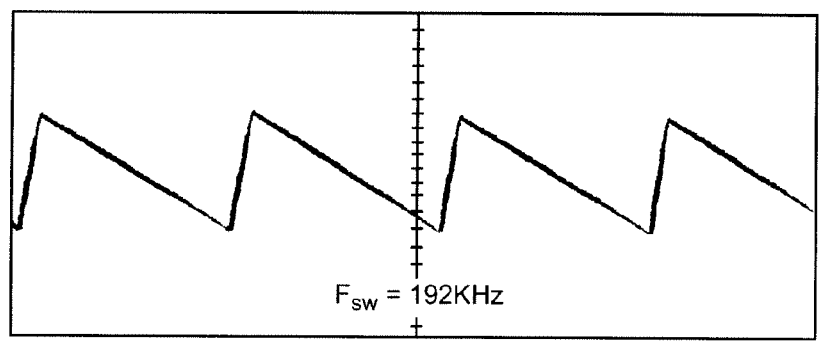

Because method #1 is similar to a constant on time period control, the switching frequency can change significantly for different load and input voltage conditions. FIGS. 16 and 17 show the inductor current waveform for input voltages of 8.7 volts and 19 volts, respectively. It should be noted that the current waveform rises more sharply when a higher input voltage is applied but that the on time period is substantially the same. Therefore the amplitude of the current ripple waveform is, undesirably, greater and the switching frequency, $F_{SW}$, is substantially reduced.

Figure 18:
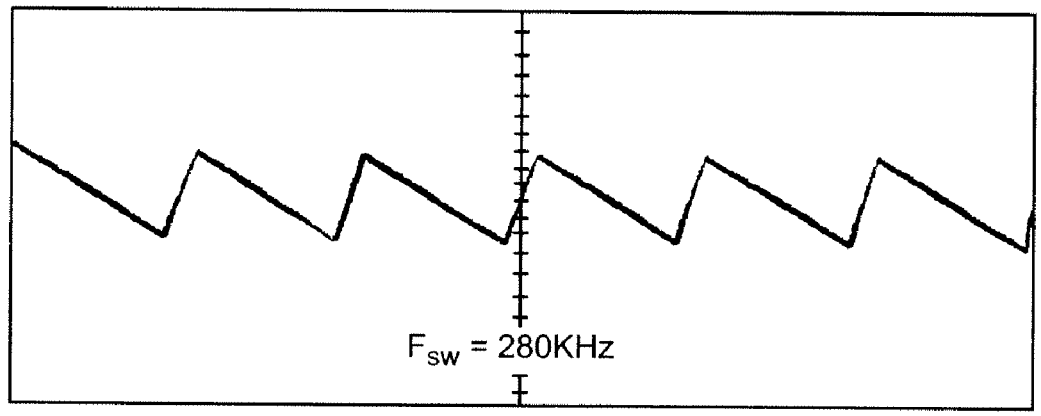
FIGS. 18 and 19 illustrate the effects of input voltage on the output waveform when switching frequency is held within a small range, in accordance with a preferred implementation of the invention.
Figure 19:
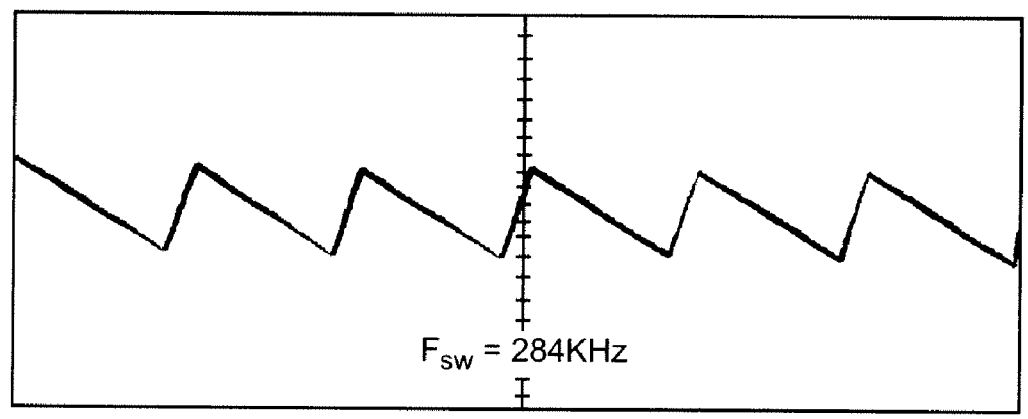

This effect is avoided in accordance with the invention by using the preferred form of method #3 in which $F_{SW}$ is held more nearly constant by using the coarse and fine regulation described above in connection with FIGS. 4-9B, above. It should be noted from FIGS. 18 and 19 (for the same respective input voltages as in FIGS. 16 and 17) in this regard that the positive-going edges of the inductor current waveform are not only less steep for a lower input voltage but extend over a longer period corresponding to a change in m through coarse regulation as described above which maintains $F_{SW}$ more nearly constant. The peak-to-peak inductor ripple current is also maintained to substantially the same value for both input voltages.

Thus it is clearly seen that the invention provides greatly increased duty cycle resolution for a given clock frequency and thus provides a duty cycle resolution which would otherwise require a much higher clock frequency than is actually used; allowing avoidance of additional power consumption that an actual increased clock frequency would otherwise require. This meritorious effect may be exploited in a number of ways and in combinations of ways to improve performance and meet increasingly stringent performance requirements while simplifying DPWM block design and fabrication.

Returning now to FIG. 3, it was noted above that the improvement in duty cycle resolution is highly non-linear (being greatest where the duty cycle is very low or very high) and, at a duty cycle near 50%, is somewhat marginal as compared with conventional DPWM methods although some loads such as microprocessors which may present a widely varying load may seldom (or never) require such an intermediate duty cycle. However, for loads that may require high voltage regulation resolution at a duty cycle near 50%, a perfecting feature of the invention will now be described with reference to FIGS. 20-23 and which can provide an improved and constant duty cycle resolution over the entire load range while also, as in the preferred form of the invention described above, providing a much higher effective clock rate (e.g. corresponding to a finer duty cycle resolution) than is actually used. It is to be understood that this perfecting feature, while not necessary to the successful practice of the basic invention as described above, can be used with the basic invention as described above to further enhance the performance thereof or used independently thereof and with or without use of the conventional DPWM methodology for coarse duty cycle resolution.

In much the same manner as the basic invention as described above effectively leveraged the time slots by allowing for variation of the switching frequency (while still providing for variation therein to be suitably limited) the perfecting feature of the invention can be used to adjust the duty cycle determined by the coarse duty cycle regulation where the improvement in resolution provided in either the basic or preferred form of method #3 is least, as described above.

As is well understood in the art, the duty cycle of a pulse width modulated signal may be adjusted at the leading edge or trailing edge of the pulse or both. In any of these three types of pulse width adjustment, a PWM digital ramp in the form of a stepped or staircase function as illustrated in FIG. 20 is preferably generated and compared with a control voltage Vc to determine the point in time when a pulse should be initiated and/or terminated to thereby determine the width of the pulse. Because of the advantages of sampling with modulation of both pulse edges because it features both a rising and falling digital ramp, referred to as double edge modulation, modulation of both leading and trailing edges of a pulse is widely used in applications in the industry. However, known designs of DPWM blocks using double edge modulation use digital ramps having the same slope.

The perfecting feature of the invention, in sharp contrast therewith, uses two clocks operating at slightly different frequencies, $f_{c1}$ and $f_{c2}$ and thus having slightly different periods or time slot durations, $T_{c1}$ and $T_{c2}$ for the falling and rising digital ramps, respectively, which thus have slightly differing slopes. Therefore, the resolution of duty cycle corresponds to the difference between these two time slot durations as illustrated in FIG. 21 showing how the alteration of thresholds can add a step duration to the timing of the trailing edge (or subtract a step duration from it) of the pulse while simultaneously removing a slightly different step duration from the leading edge of the pulse (or add a step duration to it) thus slightly increasing (or decreasing) the pulse duration from D1 to D2 (assuming $T_{c1} < T_{c2}$) rather than simultaneously adding or subtracting a step duration to or from both the leading and trailing edges of the pulse. As a result, the duty cycle change is:

$$D2-D1=(T_{c2}-T_{c1}) \times f_s$$

where $f_s$ is the system clock frequency. Thus the minimum time slot for determining resolution is $$t_{slot}=T_{c2}-T_{c1}$$

and the equivalent frequency is increased to $$f_e=(f_{c1} \times f_{c2})/(f_{c2}-f_{c1}).$$

Figure 22A:

However, the technique of FIG. 21 cannot provide such fine resolution over the entire duty cycle range since, once either the leading edge of the pulse or the trailing edge of the pulse is determined by the minimum value at the intersection of the digital ramps, the next duty cycle resolution increment or decrement is either $T_{c1}$ or $T_{c2}$. Therefore, a modified approach is preferred for practice of the invention which also utilizes two clocks operating at slightly different frequencies such that a switching period includes n times slots of duration $T_{c1}$ and m time slots of duration $T_{c2}$ from the respective clocks and which are preferably, for simplicity, synchronized at the beginning of each switching period as shown in FIG. 22A, although they could, in theory, be synchronized at any consistent point during a switching interval. If, for example, the original duty cycle is defined by the first K time slots of duration $T_{c2}$, the duty cycle is $$D_o=K/M$$

and the next larger duty cycle is obtained by using the second $T_{c1}$ clock pulse to define the leading edge and the (K+2)-th $T_{c2}$ clock pulse as defining the trailing edge of the on-period pulse. Therefore the next larger duty cycle is given by:

$$D_1=K/M+(T_{c1}-T_{c2})/T_s=K/M+(1/M+1/N)$$

and so on. More generally, with $P(T_{c2}-T_{c1})$ time slots added to the (e.g. coarse) duty cycle:

$$D_P = K/M + (P(T_{c2} - T_{c1}))/T_s$$
$$= K/M + P((1/M) - 1/N))$$
$$= (K + P(N - M)/N)/M$$

and so on. Thus the effective time slots which can be added to the duty cycle are much smaller than either $T_{c1}$ or $T_{c2}$ and thus, like the basic invention as described above, provide resolution corresponding to a much higher clock frequency than is actually employed and the increased resolution of $(T_{c1}-T_{c2})/T_s$ can be obtained over the entire duty cycle range or any desired portion thereof. Shifting of the pulse location within the switching cycle is not a significant concern since such shifting occurs only during fine regulation and occurs relatively slowly.

Figure 22B:
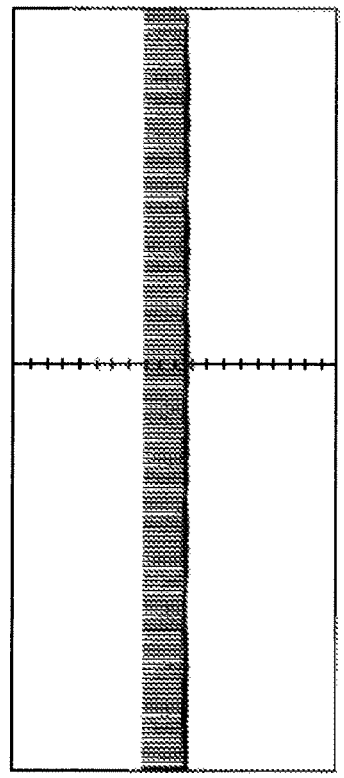

To implement the dual clock DPWM scheme, three additional functions are needed as illustrated in FIG. 22B. First, the digital controller must calculate the desired combination of different time slots to be selected as leading and trailing pulse edges of the respective clock pulse trains to develop the desired pulse width and is easily accomplished in software. Second, an additional clock (e.g. clock2) is, of course needed and may be a significant cost factor to provide very limited frequency drift from both clocks, clock1 and clock2. Third, the two clocks must be periodically synchronized which can be accomplished easily with a phase locked loop (PLL) arrangement, which is well-understood in the art. Since a PLL is also required for operation of delay lines in known DPWM arrangements (which can be eliminated by use of this perfecting feature), it is not an additional cost factor in regard to the implementation of the present invention.

It is desirable to set the respective frequencies of the two clocks as close together as possible to obtain the maximum possible duty cycle resolution. However, as alluded to above, closer frequencies require higher accuracy clock generators which are resistant to frequency drift, particularly with changes in operational and environmental conditions such as temperature. Further, closer frequencies of the clocks increases difficulty of synchronization with a PLL or other synchronization arrangements. Either or both of higher accuracy clock generators and synchronization arrangements capable of synchronizing the clock generators at slightly differing frequencies can cause substantial increase in cost. Thus, as a practical matter and after thorough analysis, it is considered by the inventors to be a preferred compromise between cost and performance to use clock generators which differ in frequency by 1 Mhz to 10 MHz in the practice of this perfecting feature of the invention. Compared with method #3, the dual clock approach of the perfecting feature of the invention can achieve constant resolution over substantially the entire duty cycle range. Further, it can be used in combination with the basic or preferred embodiment of the invention to improve the "worst case" performance of method #3 or otherwise adjust the change in resolution of duty cycle illustrated in FIG. 3 by employing the perfecting feature functionally between the coarse resolution processing and the processing of method #3 (or method #1 or #2). The chip area is also comparable to or potentially less than that required for method #3. The principal advantage of the perfecting feature of a dual clock PWM is that two slow clocks may be used to obtain a resolution that corresponds to a much higher clock frequency than is actually used and that an improvement in duty cycle resolution can be significantly improved at duty cycles near 50% as compared with methods #1, #2 and/or #3 which can be used in combination with this perfecting feature (and at the higher effective clock frequency) for even greater resolution at very high an very low duty cycles as illustrated by a dashed line labeled "dual clock" in FIG. 3. As with method #3 described above, the perfecting feature of the invention can be used to limit or avoid the use of delay lines and the chip area required for a DPWM including this perfecting feature and following the preferred frequency difference noted above at current design rules for chip layout requires about 0.1 mm$^2$ as compared with about 1.1 mm$^2$ for a conventional counter and delay line DPWM.

Figure 23:
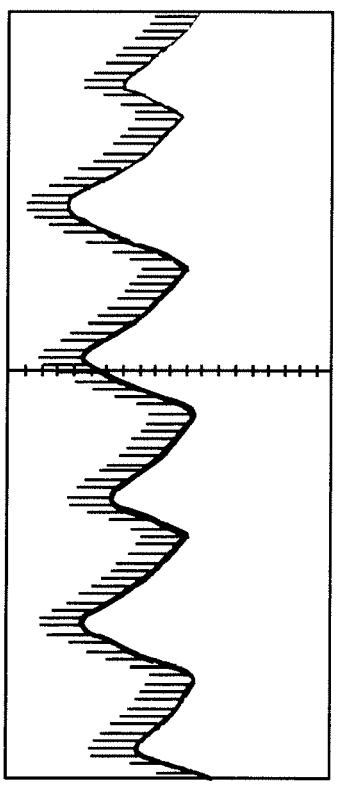

The performance of a DPWM including the dual clock perfecting feature described above (without inclusion of method #3) has been experimentally verified and the results are shown and compared with the conventional DPWM method/design in FIG. 23. The experiment utilized a buck converter similar to that of FIG. 13 with a 12 V input voltage, 1.2 V output and 300 KHz switching frequency and using a 30 MHZ clock in the conventional DPWM and 25 MHZ and 30 MHz clocks in the dual clock DPWM. It is clearly seen that the conventional DPWM exhibits significant (e.g. 60 mV) limit cycle oscillations and a 120 mV voltage resolution which are entirely avoided by the dual clock perfecting feature of the invention (since the resolution is smaller than the ADC resolution) which exhibits a voltage resolution of 24 mV and an equivalent clock frequency of 150 MHz, over five times the clock frequency actually used. It should also be recognized that the dual clock perfecting feature of the invention does not require change of $F_{SW}$, to leverage the clock rate as is required by method #3, described above.

In view of the foregoing, it is seen that the invention provides greatly enhanced duty cycle resolution and voltage resolution for a switching voltage regulator or power converter without requiring use of an increased clock frequency which consumes excessive power. Use of delay lines with their associated disadvantages is severely limited or avoided altogether. The dual clock perfecting feature can be used alternatively to or in combination with the basic invention to achieve much higher effective clock frequencies much higher than the clock frequencies actually used to obtain a given duty cycle resolution.

While the invention has been described in terms of a single preferred embodiment, those skilled in the art will recognize that the invention can be practiced with modification within the spirit and scope of the appended claims.

The invention claimed is:

1. A digital pulse width modulator comprising
a switching circuit connected to an input voltage source, and
a control circuit for establishing a duty cycle of said switching circuit, said control circuit comprising at least one of:
a clock circuit for establishing a constant number of time slots during which said switching circuit will be on or said switching circuit will be off during a switching cycle of said switching circuit, and means for adjusting a number of time slots in a said switching cycle of said switching circuit; and
two clock circuits operating at different frequencies and synchronized in a switching period of said switching circuit, and means for calculating a leading edge time in accordance with an output of one of said two clock circuits and a trailing edge time in accordance with an output of one of said two clock circuits to provide a desired pulse width within a said switching period of said switching circuit.

2. A digital pulse width modulator as recited in claim 1, wherein said circuit for establishing a constant number of time slots establishes a constant number of time slots when said switching circuit will be on when a required duty cycle is less than 50% and establishes a constant number of time slots when said switching circuit will be off when a required duty cycle is greater than 50%.

3. A digital pulse width modulator as recited in claim 2, wherein said means for adjusting a number of time slots in a said switching cycle of said switching circuit is limited for each of a plurality of said constant numbers of time slots when said switching circuit will be on or off.

4. A digital pulse width modulator as recited in claim 2, wherein each of a plurality of constant number of time slots when said switching circuit will be on or off provides a coarse duty cycle resolution and the number of time slots in a switching cycle of said switching circuit established by said means for adjusting a number of time slots in a said switching cycle of said switching circuit is limited in number for each said constant number of time slots to provide fine duty cycle resolution.

5. A digital pulse width modulator as recited in claim 4, wherein said constant numbers of time slots when said switching circuit is on or off and said number of time slots in a said switching cycle provide regular fine increments of duty cycle over a range of duty cycles.

6. A digital pulse width modulator as recited in claim 1, wherein said means for adjusting a number of time slots in a said switching cycle of said switching circuit is limited for each of a plurality of said constant numbers of time slots when said switching circuit will be on or off.

7. A digital pulse width modulator as recited in claim 1, wherein each of a plurality of constant number of time slots when said switching circuit will be on or off provides a coarse duty cycle resolution and the number of time slots in a switching cycle of said switching circuit established by said means for adjusting a number of time slots in a said switching cycle of said switching circuit is limited in number for each said constant number of time slots to provide fine duty cycle resolution.

8. A digital pulse width modulator as recited in claim 7, wherein said constant numbers of time slots when said switching circuit is on or off and said number of time slots in a said switching cycle provide regular fine increments of duty cycle over a range of duty cycles.

9. A digital pulse width modulator as recited in claim 1, wherein said two clock circuits are synchronized with a phase locked loop.

10. A digital pulse width modulator as recited in claim 1, wherein frequencies of said two clock circuits are less than a frequency of said clock circuit for establishing time slots.

11. A digital pulse width modulator comprising
a switching circuit connected to an input voltage source, and
a control circuit for establishing a duty cycle of said switching circuit, said control circuit comprising
a coarse duty cycle resolution arrangement for determining a number of time slots for which said switching circuit will be on within a switching cycle of said switching circuit, and
a fine duty cycle resolution arrangement comprising at least one of:
a clock circuit for establishing a constant number of time slots during which said switching circuit will be on or said switching circuit will be off during a switching cycle of said switching circuit, and means for adjusting a number of time slots in a said switching cycle of said switching circuit; and
two clock circuits operating at different frequencies and synchronized to a switching period of said switching circuit, and means for calculating a leading edge time in accordance with an output of one of said two clock circuits and a trailing edge time in accordance with an output of one of said two clock circuits to provide a desired pulse width within a said switching period of said switching circuit.

12. A digital pulse width modulator as recited in claim 11, wherein said circuit for establishing a constant number of time slots establishes a constant number of time slots when said switching circuit will be on when a required duty cycle is less than 50% and establishes a constant number of time slots when said switching circuit will be off when a required duty cycle is greater than 50%.

13. A digital pulse width modulator as recited in claim 12, wherein said means for adjusting a number of time slots in a said switching cycle of said switching circuit is limited for each of a plurality of said constant numbers of time slots when said switching circuit will be on or off.

14. A digital pulse width modulator as recited in claim 11, wherein said means for adjusting a number of time slots in a said switching cycle of said switching circuit is limited for each of a plurality of said constant numbers of time slots when said switching circuit will be on or off.

15. A digital pulse width modulator as recited in claim 11, wherein each of a plurality of constant number of time slots when said switching circuit will be on or off provides a coarse duty cycle resolution and the number of time slots in a switching cycle of said switching circuit established by said means for adjusting a number of time slots in a said switching cycle of said switching circuit is limited in number for each said constant number of time slots to provide fine duty cycle resolution.

16. A digital pulse width modulator as recited in claim 15, wherein said constant numbers of time slots when said switching circuit is on or off and said number of time slots in a said switching cycle provide regular fine increments of duty cycle over a range of duty cycles.

17. A digital pulse width modulator as recited in claim 11, wherein said two clock circuits are synchronized with a phase locked loop.

18. A digital pulse width modulator as recited in claim 11, wherein frequencies of said two clock circuits are less than a frequency of said clock circuit for establishing time slots.

19. A method of digital pulse width modulation including steps of
setting a constant number of time slots in which a signal is in one of two states in each of a plurality of switching cycles,
adjusting a number of time slots in each said switching cycle of said plurality of switching cycles, and
limiting the number of time slots by which a switching cycle can be adjusted by said adjusting step to limit variation of said switching cycle.

20. A method as recited in claim 19 further including steps of
establishing two pulse trains at different clock frequencies,
selecting a leading edge of a pulse in accordance with a pulse of one of said two pulse trains, and
selecting a trailing edge of a pulse in accordance with a pulse of one of said two pulse trains.

21. A digital pulse width modulation method comprising steps of
establishing two pulse trains at different clock frequencies,
selecting a leading edge for a pulse width modulated pulse in accordance with a pulse of one of said two pulse trains, and
selecting a trailing edge for a pulse width modulated pulse in accordance with a pulse of one of said two pulse trains,
whereby said leading edge and said trailing edge define a pulse width modulated pulse.

* * * * *